(12) United States Patent
Lee et al.

(10) Patent No.: US 8,976,143 B2
(45) Date of Patent: Mar. 10, 2015

(54) TOUCH DETECTING METHOD AND FLAT DISPLAY DEVICE WITH IN-CELL TOUCH PANEL

(75) Inventors: Ping-Hwan Lee, Hsin-Chu (TW); Yu-Min Hsu, Hsin-Chu (TW); Yung-Tse Cheng, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 530 days.

(21) Appl. No.: 13/033,271

(22) Filed: Feb. 23, 2011

(65) Prior Publication Data

US 2011/0285663 A1 Nov. 24, 2011

(30) Foreign Application Priority Data

May 18, 2010 (TW) .............................. 99115816 A (51) Int. Cl.
- G06F 3/045 (2006.01)
- G06F 3/044 (2006.01)
- G06F 3/041 (2006.01)

(52) U.S. Cl.
CPC .............. G06F 3/044 (2013.01); G06F 3/0416 (2013.01)
USPC ........................................................ 345/174

(58) Field of Classification Search
CPC ... G06F 3/0488; G06F 3/04883; G06F 3/044; G06F 3/04886; G06F 3/0415; G06F 3/033; G06F 3/0317; G06F 3/03545
USPC ........................................................ 345/174
See application file for complete search history.

(56) References Cited

U.S. PATENT DOCUMENTS

| | | | |
|---|---|---|---|
| 2007/0229468 A1* | 10/2007 | Peng et al. ..................... | 345/173 |
| 2010/0026639 A1* | 2/2010 | Lee et al. ....................... | 345/173 |
| 2010/0045635 A1* | 2/2010 | Soo ............................... | 345/178 |
| 2010/0060610 A1* | 3/2010 | Wu ............................... | 345/174 |
| 2010/0295824 A1* | 11/2010 | Noguchi et al. ............... | 345/175 |
| 2011/0080390 A1* | 4/2011 | Katoh et al. .................. | 345/207 |
| 2011/0210941 A1* | 9/2011 | Reynolds et al. ............. | 345/174 |

* cited by examiner

Primary Examiner — Andrew Sasinowski
Assistant Examiner — Mihir Rayan
(74) Attorney, Agent, or Firm — WPAT, PC; Justin King (57) ABSTRACT

A touch detecting method comprises: enabling a sample signal in a period between driving a previous gate line and a previous two gate line before a corresponding gate line of a sense unit, and sampling a readout signal in a corresponding readout line during a sample period corresponding to the enabled sample signal by a readout unit; using the sampled readout signal during the sample period by the readout unit as a sample reference signal; enabling a sense readout signal in a period between driving the corresponding gate line of the sense unit and a next gate line, and reading out the readout signal during a sense readout period corresponding to the enabled sense readout signal; using the readout signal during the sense readout period as a sense signal; and judging whether the sense unit is touched according to the sample reference signal and the sense signal.

15 Claims, 6 Drawing Sheets

TOUCH DETECTING METHOD AND FLAT DISPLAY DEVICE WITH IN-CELL TOUCH PANEL

BACKGROUND

1. Technical Field

The present invention relates to the touch detecting field, and more particularly to a touch detecting method applied to a flat display device with an in-cell touch panel and a flat display device with an in-cell touch panel.

2. Description of the Related Art

With the rapid development of science and technology, since flat display device (such as, liquid crystal display device) has many advantages such as high image quality, little size, light weight and wide application-range, etc., it is widely applied to various consumer electronics products, such as mobile phones, notebook computers, desktop display devices and televisions, etc., and has gradually substituted conventional cathode ray tube (CRT) display to be a main trend of the display devices.

Touch device provides a new human-machine interface, and it is more intuitional in use and more suitable for the human nature. If the touch device is integrated with the liquid crystal display device together, the liquid crystal display device can have touch function, and it is a development trend of the liquid crystal display devices.

Figure 1:
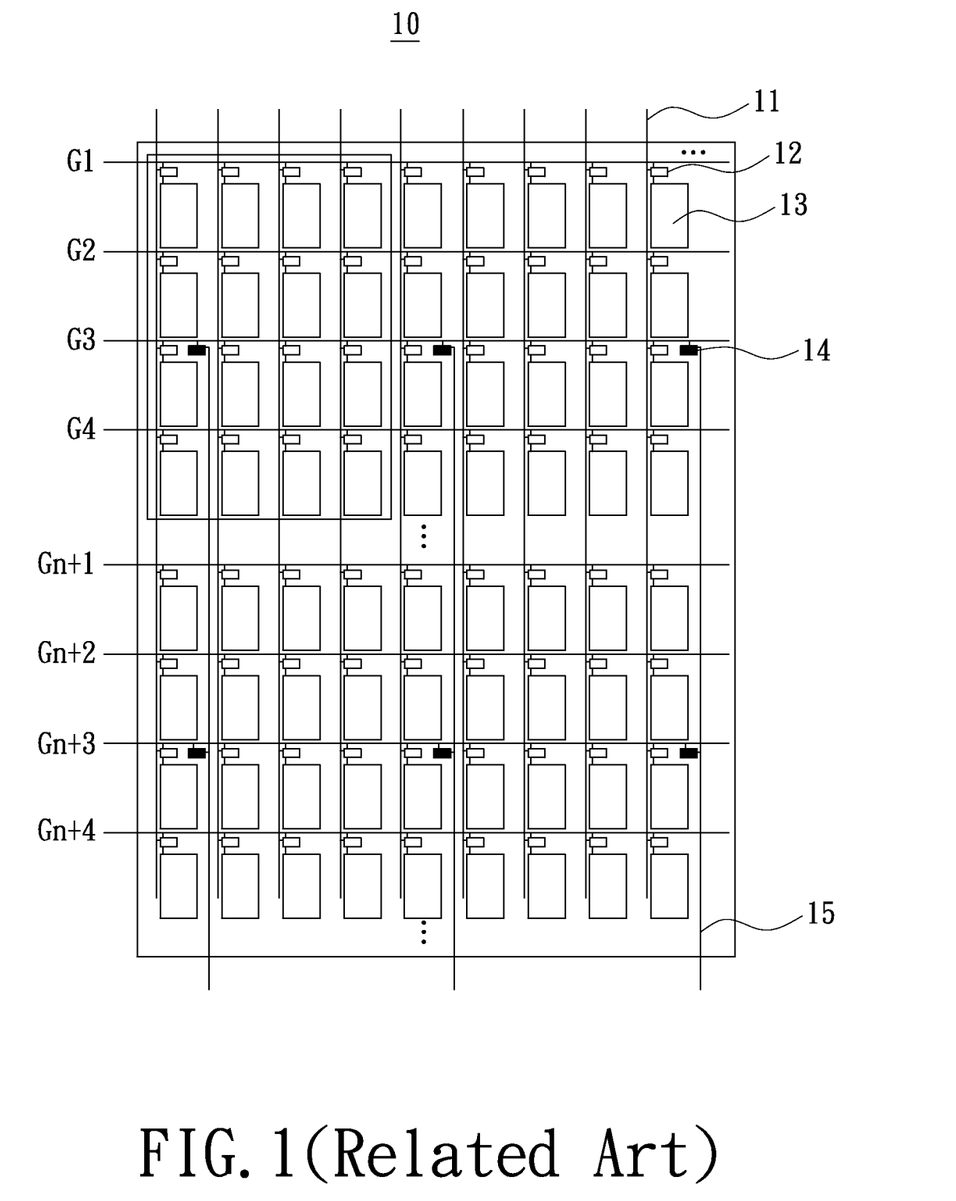
FIG. 1 is a schematic structure view of a flat display device with in-cell touch panel.

Refer to FIG. 1, which is a schematic structure view of a flat display device with in-cell touch panel. As shown in FIG. 1, the flat display device 10 comprises a plurality of gate lines $G_1 \sim G_4, \ldots, G_{n+1} \sim G_{n+4}, \ldots$ (n=0, 4, 8, ...), a plurality of data lines 11, a plurality of pixel transistors 12, a plurality of pixel electrodes 13, a plurality of sense units 14 and a plurality of readout lines 15. The gate lines $G_1 \sim G_4, \ldots, G_{n+1} \sim G_{n+4}, \ldots$ are arranged crossing over with the data lines 11, and thereby dividing the flat display device 10 into a plurality of pixel regions (not marked). Each of the pixel regions has a pixel transistor 12 and a pixel electrode 13 disposed therein, and the pixel transistor 12 in each of the pixel regions is electrically coupled to a corresponding one of the gate lines and a corresponding one of the data lines. Thus a gate signal provided on the corresponding gate line is configured for determining whether switching on the pixel transistor 12, and a data signal provided on the corresponding data line is transmitted to the pixel electrode 13 when the pixel transistor 12 is switched on. This technology is well-known for the persons skilled in the art, and thus will not be described in detail herein.

Figure 2:
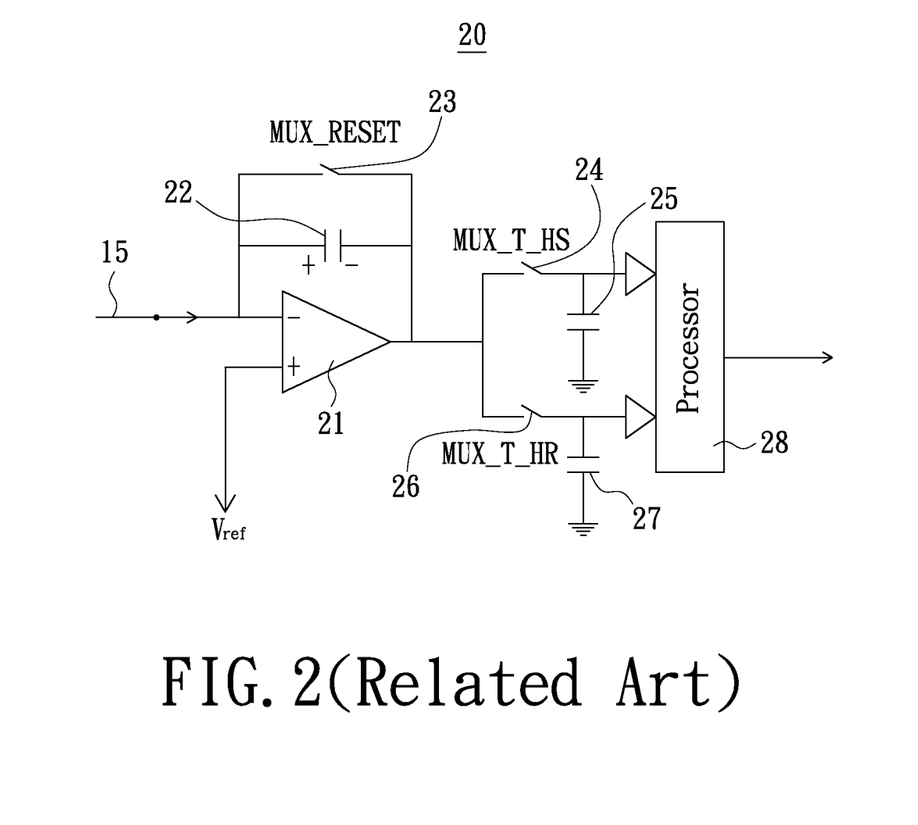
FIG. 2 is a schematic circuit block diagram of a readout unit.

The sense units 14 are disposed in some of the pixel regions of the flat display device 10 respectively. Furthermore, each of the sense units 14 is electrically coupled to a corresponding one of the gate lines (such as the gate line Gn+3 as shown in FIG. 1, wherein n=0, 4, 8 ... ) and a corresponding one of the readout lines 15, thus the gate signal provided on the corresponding gate line drives this sense unit 14, and this sense unit 14 further is electrically coupled to a readout unit 20 as shown in FIG. 2 through the corresponding readout line 15. In the flat display device 10 as shown in FIG. 1, each of the sense units 14 is configured for sensing 4×4 pixel regions (as denoted by the solid rectangle on the left-top corner of FIG. 1).

Refer to FIG. 2, which is a schematic circuit block diagram of a readout unit. As shown in FIG. 2, the readout unit 20 comprises an operational amplifier 21, a first capacitor 22, a first switch 23, a second switch 24, a second capacitor 25, a third switch 26, a third capacitor 27 and a processor 28. A positive input terminal of the operational amplifier 21 is electrically coupled to a reference voltage $V_{ref}$, and a negative input terminal thereof is electrically coupled to the readout line 15 to receive the readout signal in the readout line 15. The first capacitor 22 is electrically between the negative input terminal and an output terminal of the operational amplifier 21, and the first switch 23 is electrically coupled with the first capacitor 22 in parallel. The second switch 24 and the third switch 26 are electrically coupled between the output terminal of the operational amplifier 21 and the processor 28 in parallel. The second capacitor 25 is electrically coupled between the second switch 24 and a grounding potential, and the third capacitor 26 is electrically coupled between the third switch 26 and the grounding potential. The processor 28 is electrically coupled to the second capacitor 25 and the third capacitor 26.

Figure 3:
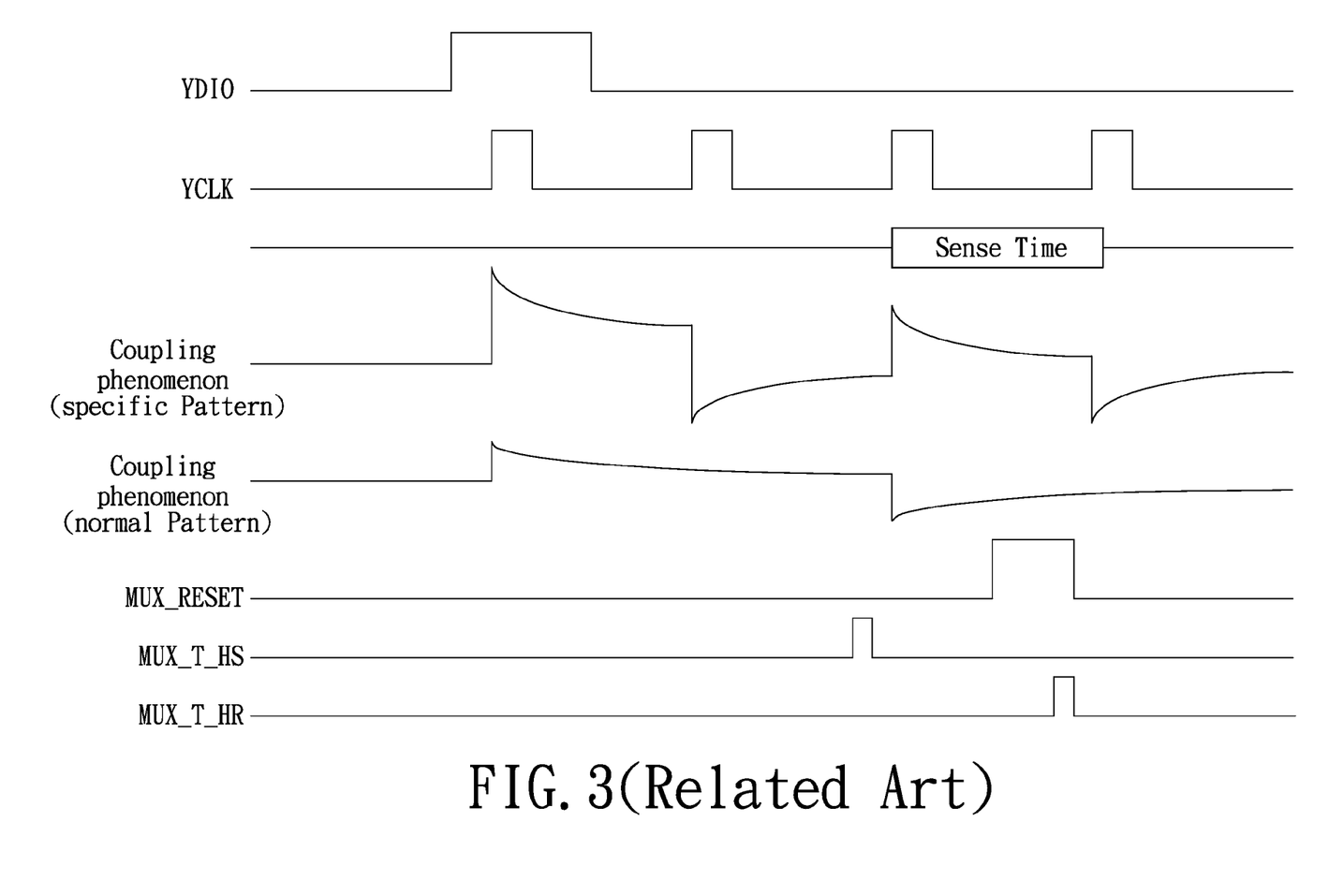
FIG. 3 is a schematic timing sequence view of various signals of a conventional touch detecting method.

Refer to FIG. 3, which is a schematic timing sequence view of various signals of a conventional touch detecting method. As shown in FIGS. 1-3, a sample signal MUX_T_HS is enabled in a period between driving the corresponding gate line $G_{n+3}$ and the nearest gate line $G_{n+2}$ preceding the gate line $G_{n+3}$ of each of the sense units 14, thus the second switch 24 controlled by the sample signal MUX_T_HS is switched on. At this moment, the readout signal in the readout line 15 passes through the switched-on first switch 23 and the switched-on second switch 24 to be transmitted and stored into the second capacitor 25 as a sample reference signal $V_{HS}$. Then, a sense readout signal MUX_T_HR is enabled in another period between driving the corresponding gate line $G_{n+3}$ of each of the sense unit 14 and the nearest gate line $G_{n+4}$ succeeding the gate line $G_{n+3}$, thus the third switch 26 controlled by the sense readout signal MUX_T_HR is switched on. At the moment, the first switch 23 is switched off due to the signal MUX_RESET, the readout signal in the readout line 15 passes through the operational amplifier 21 and the switched-on third switch 26 to be transmitted and stored into the third capacitor 27 as a sense signal $V_{HR}$. Finally, the processor 28 judges whether the sense unit 14 is touched according to the sample reference signal $V_{HS}$ stored in the second capacitor 25 and the sense signal $V_{HR}$ stored in the third capacitor 27.

However, as shown in FIG. 3, when the flat display device 10 displays a pattern, the inputted gate signals would cause a capacitance-coupling phenomenon/effect to the sense unit 14, to influence the readout signal in the readout line 15 such that a capacitance-coupling noise is produced in the readout signal. In detail, when the flat display device 10 displays a normal pattern, every two gate lines reverse the polarity once, thus it generates a slight capacitance-coupling phenomenon to the sense unit 14, the capacitance-coupling noise of the readout signal in the readout line 15 is slight, and it will not influence the sense result. When the flat display device 10 displays a specific pattern, every one gate line reverse the polarity once, thus it generates a large capacitance-coupling phenomenon to the sense unit 14, the capacitance-coupling noise of the readout signal in the readout line is large. Specially, since the conventional touch detecting method enables the sample signal MUX_T_HS in the period between driving the corresponding gate line $G_{n+3}$ and the previous gate line $G_{n+2}$ of the sense units 14, and at the moment the readout signal in the readout line 15 is regarded as the sample reference signal $V_{HS}$, the capacitance-coupling noise of the specific pattern in the sample reference signal $V_{HS}$ has the polarity opposite to that of the capacitance-coupling noise of the specific pattern in the sense signal $V_{HR}$. Thus if employing ($V_{HR}-V_{HS}$) to judge whether the sense unit 14 is touched, the sense result is influenced by the double of the capacitance-coupling noise of the specific pattern. That is, the sense result of the conventional touch detecting method is seriously influenced by the capacitance-coupling noise, and the final sense result thereof may be altered.

BRIEF SUMMARY

The present invention relates to a touch detecting method, which can reduce the influence of the capacitance-coupling phenomenon so as to obtain an accurate sense result.

The present invention also relates to a flat display device with an in-cell touch panel, which can reduce the influence of the capacitance-coupling phenomenon so as to obtain an accurate sense result.

A touch detecting method in accordance with a preferred exemplary embodiment, is applied to a flat display device with an in-cell touch panel. The flat display device comprises a plurality of gate lines, a plurality of data lines, a plurality of sense units and a plurality of readout lines. The gate lines are arranged crossing over with the data lines and thereby dividing the flat display device into a plurality of pixel regions. The sense units are disposed into some of the pixel regions, and each of the sense units is electrically coupled to a corresponding one of the gate lines and thereby being driven by a gate signal on the corresponding gate line, and each of the sense units is further electrically coupled to a corresponding one of the readout lines so as to electrically couple to a readout unit. The touch detecting method comprises: enabling a sample signal during a period between driving the nearest gate line and the second nearest gate line preceding the corresponding gate line of one of the sense units, and sampling a readout signal by the readout unit on the corresponding readout line of the sense unit during a sample period corresponding to the sample signal being enabled; using the readout signal sampled by the readout unit during the sample period as a sample reference signal; enabling a sense readout signal during another period between driving the corresponding gate line and the nearest gate line succeeding the corresponding gate line of the sense unit, and reading out the readout signal by the readout unit on the corresponding readout line during a sense readout period corresponding to the sense readout signal being enabled; using the readout signal read out by the readout unit during the sense readout period as a sense signal; and determining whether the sense unit is touched according to the sample reference signal and the sense signal.

A flat display device with an in-cell touch panel in accordance with another preferred exemplary embodiment of the present invention comprises a plurality of gate lines, a plurality of data lines, a plurality of sense units and a plurality of readout lines. The gate lines are arranged crossing over with the data lines to divide the flat display device into a plurality of pixel regions. The sense units are disposed into some of the pixel regions, and each of the sense units is electrically coupled to a corresponding one of the gate lines and thereby being driven by a gate signal on the corresponding gate line and further electrically coupled to a corresponding one of the readout lines. Each of the readout units employs the corresponding readout line to be electrically coupled to a corresponding sense unit. When performing a touch detecting operation, a sample signal is enabled during a period between driving the nearest gate line and the second nearest gate line preceding the corresponding gate line of one of the sense units, and a corresponding one of the readout units samples the corresponding readout line during a sample period corresponding to the sample signal being enabled to obtain a sample reference signal. A sense readout signal is enabled during another period between driving the corresponding gate line of the sense unit and the nearest gate line succeeding the corresponding gate line of the sense unit, and the corresponding readout unit samples the corresponding readout line during a sense readout period corresponding to the sense readout signal being enabled to obtain a sense signal and then the sense unit whether is touched or not is determined according to the sample reference signal and the sense signal.

Preferably, each of the readout units comprises an operational amplifier, a first capacitor, a first switch, a second switch, a second capacitor, a third switch, a third capacitor and a processor. A positive input terminal of the operational amplifier is electrically coupled to a reference voltage, a negative input terminal thereof is electrically coupled to the corresponding readout line, and an output terminal thereof is configured for outputting the sample reference signal or the sense signal. The first capacitor is electrically coupled between the negative input terminal and the output terminal of the operational amplifier. The first switch is electrically coupled between the negative input terminal and the output terminal of the operational amplifier and in parallel with the first capacitor. The second switch is electrically coupled to the output terminal of the operational amplifier. The second capacitor is electrically coupled between the second switch and a grounding potential to receive and store the sample reference signal when switching on the second switch. The third switch is electrically coupled to the output terminal of the operational amplifier. The third capacitor is electrically coupled between the third switch and the grounding potential to receive and store the sense signal when the third switch is switched on. The processor is electrically coupled to the second capacitor and the third capacitor to determine whether the sense unit is touched according to the sample reference signal and the sense signal.

Preferably, every four of the gate lines in the flat display device are divided into a group, and the sense units are respectively electrically coupled to third gate lines of the groups.

Preferably, the first switch is switched off when using the readout signal read out by the readout unit during the sense readout period as the sense signal.

Preferably, the first switch is switched on when using the readout signal sampled by the readout unit during the sample period as the sample reference signal. Alternatively, the first switch is switched off when using the readout signal sampled by the readout unit during the sample period as the sample reference signal. In another embodiment, for the sense units corresponding to a first group of the gate lines, the first switch is switched on when using the readout signal sampled by the readout unit during the sample period as the sample reference signal; and for the sense units corresponding to the other groups of the gate lines, the first switch is switched off when using the readout signal sampled by the readout unit during the sample period as the sample reference signal.

The touch detecting method and the flat display device with the in-cell touch panel of the present invention can make the capacitance-coupling noises in the sample reference signal have the polarity same to that in the sense signal, to cancel out/counteract the capacitance-coupling noises respectively in the sample reference signal and the sense signal. Accordingly, the touch detecting method and the flat display device of the present invention can eliminate the influence of the capacitance-coupling phenomenon, and thus the sense result thereof is accurate.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 4:
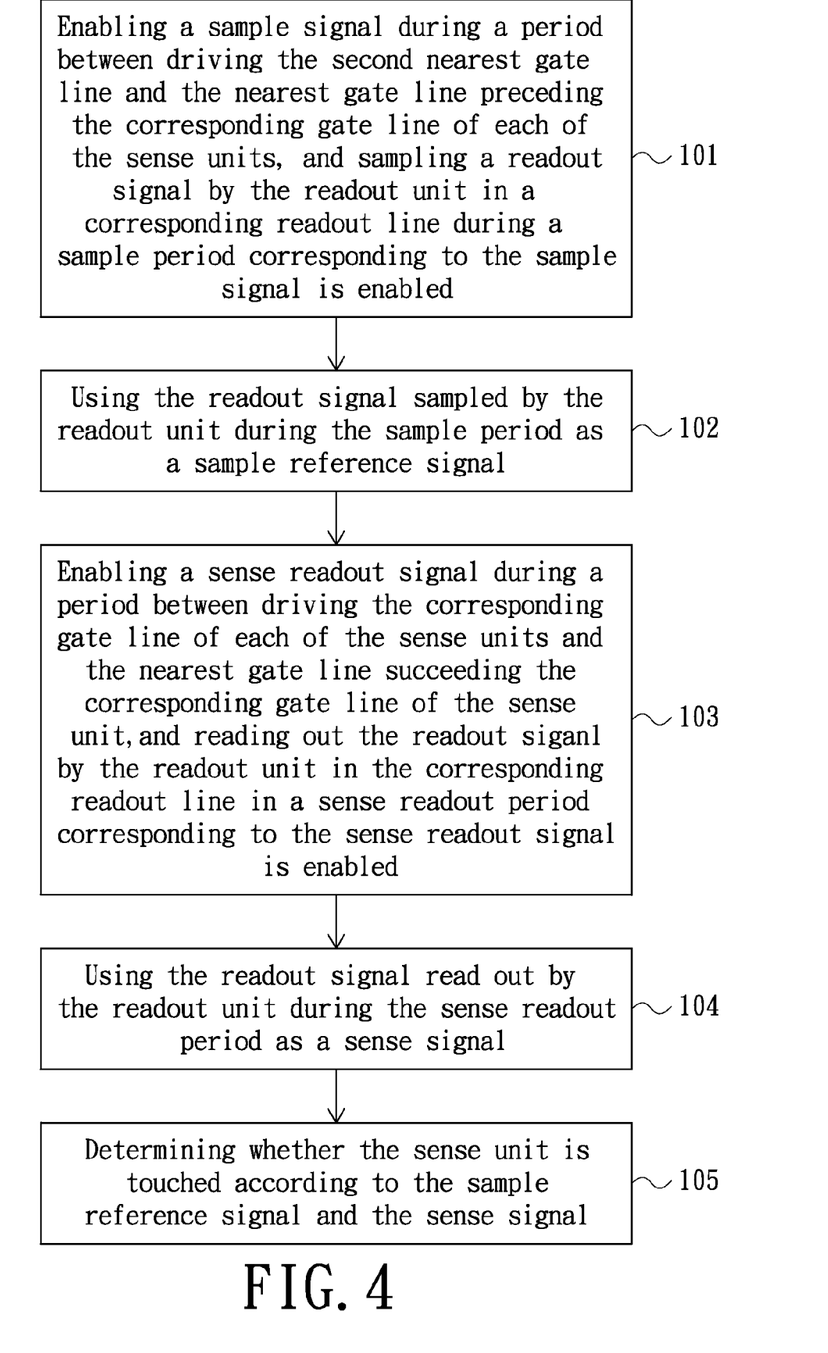
FIG. 4 is a flowing chart of a touch detecting method of the present invention.
Figure 5:
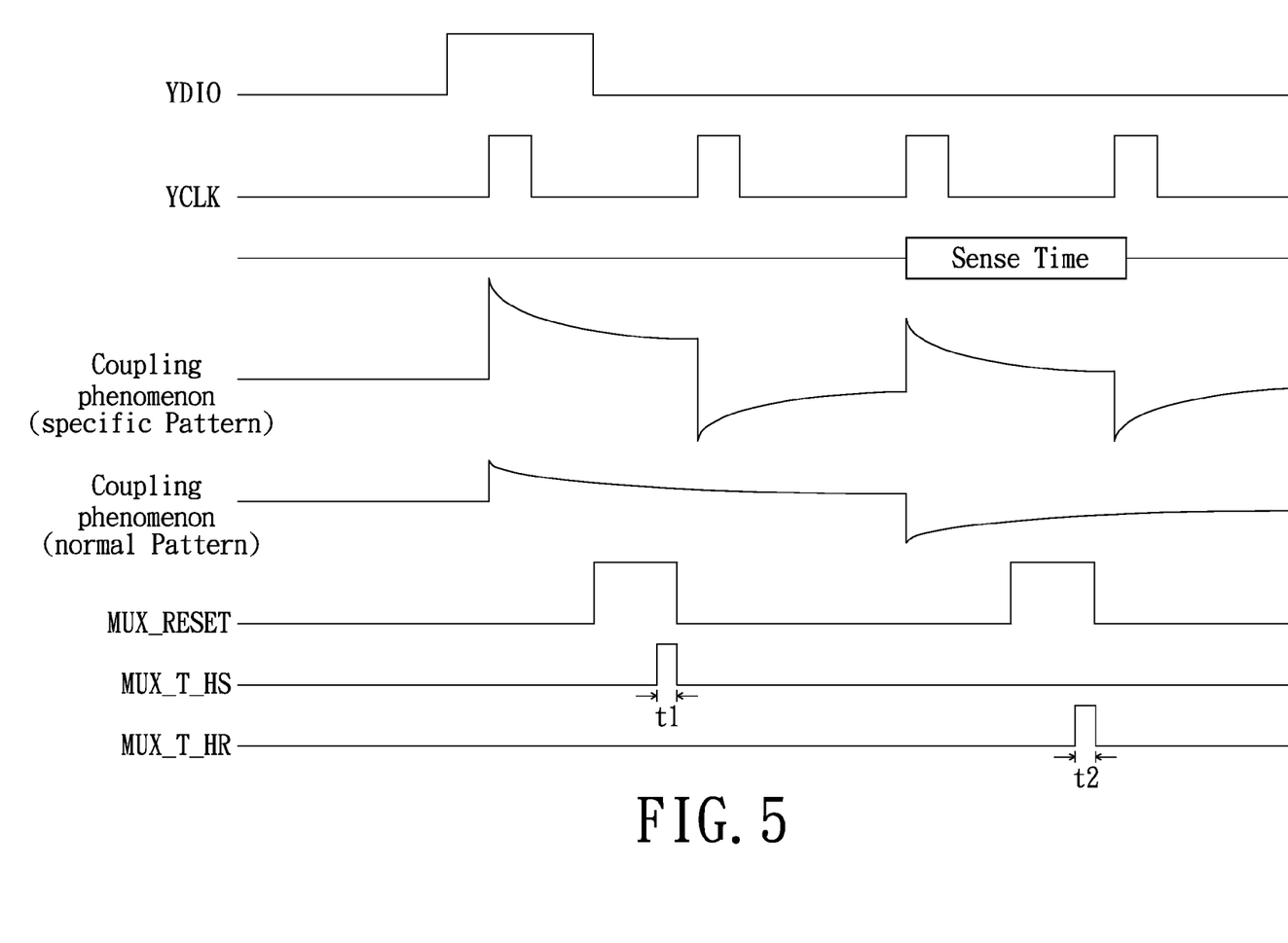
FIG. 5 is a schematic timing sequence view of various signals of a touch detecting method in accordance with a first preferred exemplary embodiment of the present invention.

Refer to FIGS. 4-5, wherein FIG. 4 is a flowing chart of a touch detecting method of the present invention, and FIG. 5 is a schematic timing sequence view of various signals of the touch detecting method in accordance with a first preferred exemplary embodiment of the present invention. The touch detecting method as shown in FIGS. 4-5 may be applied to the flat display device 10 with the in-cell touch panel as shown in FIGS. 1-2.

Referring to FIGS. 1-2 and 4-5 together, the touch detecting method of the exemplary embodiment comprises steps 101~105. The step 101 is that enabling the sample signal MUX_T_HS during a period between driving the second nearest gate line $G_{n+1}$ and the nearest gate line $G_{n+2}$ preceding the corresponding gate line $G_{n+3}$ of each of the sense units 14, and sampling a readout signal by the readout unit 20 in a corresponding readout line 15 during a sample period t1 corresponding to the sample signal MUX_T_HS is enabled. The step 102 is that using the readout signal sampled by the readout unit 20 during the sample period t1 as the sample reference signal $V_{HS}$. The step 103 is that enabling the sense readout signal MUX_T_HR during a period t2 between driving the corresponding gate line Gn+3 of each of the sense units 14 and the nearest gate line Gn+4 succeeding the corresponding gate line of the sense unit, and reading out the readout signal by the readout unit 20 in the corresponding readout line 15 in a sense readout period t2 corresponding to the sense readout signal MUX_T_HR is enabled. The step 104 is that using the readout signal read out by the readout unit 20 during the sense readout period t2 as the sense signal $V_{HR}$. The step 105 is that determining whether the sense unit 14 is touched according to the sample reference signal $V_{HS}$ and the sense signal $V_{HR}$.

In detail, when the sample signal MUX_T_HS is enabled, the second switch 24 in the readout unit 20 which is controlled by the sample signal MUX_T_HS, is switched on. Thus the readout unit 20 samples the readout signal in the readout line 15 during the sample period t1, and stores the readout signal in the readout line 15 into the second capacitor 25. In addition, since the first switch 23 is controlled by the control signal MUX_RESET, and as shown in FIG. 5, the control signal MUX_RESET is in an enable state during the sample period t1 in the exemplary embodiment, the first switch 23 is switched off during the sample period t1 (in the exemplary embodiment, the first switch 23 is switched off and not in on-state when enabling the control signal MUX_RESET, and the second switch 24 and the third switch 25 are switched off when enabling the sample signal MUX_T_HS and MUX_T_HR respectively). Therefore, the readout signal in the readout line 15 during the sample period t1 passes through the integration circuit composed of the operational amplifier 21 and the first capacitor 22, and is transmitted to the switched-on second switch 24, and then is transmitted to the second capacitor 25 through the switched-on second switch 24 and stored in the second capacitor 25, to be regarded as the sample reference signal $V_{HS}$.

When the sense readout signal MUX_T_HR is enabled, the third switch 26 in the readout unit 20 which is controlled by the sense readout signal MUX_T_HR, is switched on. At the moment, the control signal MUX_RESET is also in the enabled state, thus the first switch 23 is switched off. Therefore, the readout signal in the readout line 15 during the sense readout period t2 passes through the integration circuit composed of the operational amplifier 21 and the first capacitor 22, and the switched-on third switch 26 to be transmitted to the third capacitor 27 and stored in the third capacitor 27 for being regarded as the sense signal $V_{HR}$.

Then, the processor 28 judges whether the sense unit 14 is touched according to the sample reference signal $V_{HS}$ and the sense signal $V_{HR}$. According to the equivalent circuit, it can be seen that, the sample reference signal of the present invention can be obtained by $V_{HS}=(V_{ref}-V_{CF(HS)})$, and the sense signal thereof is obtained by $V_{HR}=(V_{ref}-V_{CF(HR)})$. Thus the output result of the processor 28 of the readout unit 20 is obtained by $(V_{HS}-V_{HR})=[(V_{ref}-V_{CF(HS)})-(V_{ref}-V_{CF(HR)})]=[-V_{CF(HS)}+V_{CF(HR)}]$, wherein $V_{ref}$ is the reference voltage electrically coupled to the positive input terminal of the operational amplifier 21, $V_{CF(HS)}$ is the voltage of the first capacitor 22 during the sample period t1, $V_{CF(HR)}$ is the voltage of the first capacitor 22 during the sense readout period t2. When the sense unit 14 is not touched, $V_{CF(HR)}$ is zero and the output result of the processor 28 is approximately 0. When the sense unit 14 is touched, $V_{CF(HR)}$ approaches the reference voltage $V_{ref}$, and the output result of the processor 28 is approximately the reference voltage $V_{ref}$. Therefore, the processor 28 can judge whether the sense unit 14 is touched according to the sample reference signal $V_{HS}$ and the sense signal $V_{HR}$.

Since the touch detecting method of the exemplary embodiment enables the sample signal MUX_T_HS during the period between driving the second nearest gate line Gn+1 and the nearest gate line Gn+2 preceding the corresponding gate line Gn+3 of each sense unit 14, when the flat display device 10 displays the specific pattern, the capacitance-coupling noise in the readout signal of the readout line 15 which is sampled by the readout unit 20 during the sample period t1, when enabling the sample signal MUX_T_HS, has the polarity same to that of the capacitance-coupling noise in the readout signal of the readout line 15 which is sampled by the readout unit 20 during the sense readout period t2, when enabling the sense readout signal MUX_T_HR. That is, the capacitance-coupling noise in the sample reference signal $V_{HS}$ has the polarity same to that in the sense signal $V_{HR}$, thus the capacitance-coupling noises in the sample reference signal $V_{HS}$ and the sense signal $V_{HR}$ are cancelled out. The touch detecting method of the present invention can eliminate the influence of the capacitance-coupling phenomenon, and thus the sense result is accurate.

Figure 6:
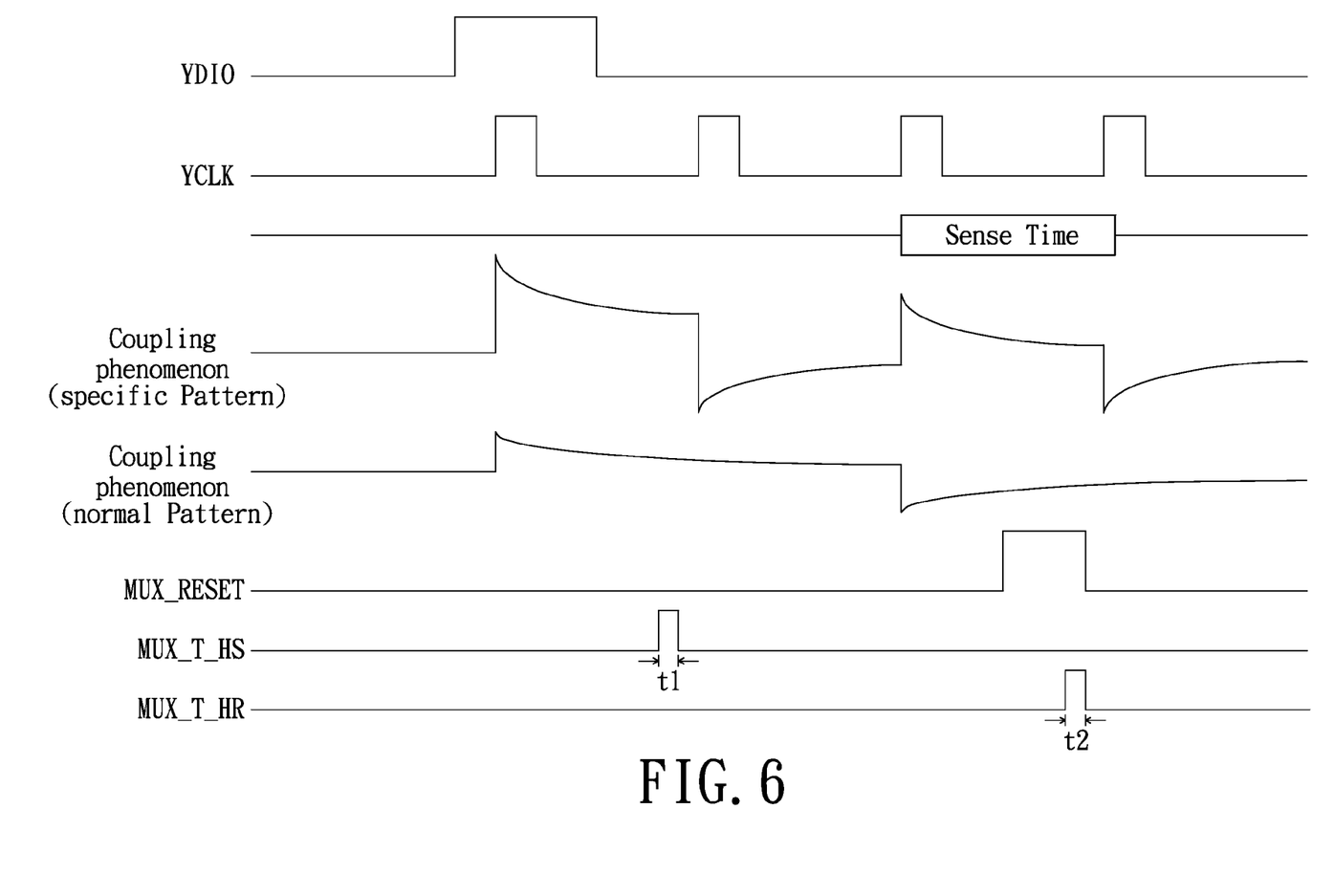
FIG. 6 is a schematic timing sequence view of various signals of a touch detecting method in accordance with a second preferred exemplary embodiment of the present invention.

Refer to FIG. 6, which is a schematic timing sequence view of various signals of a touch detecting method in accordance with a second preferred exemplary embodiment of the present invention. The touch detecting method of the exemplary embodiment is similar with that as shown in FIG. 5, except that the touch detecting method of the second exemplary embodiment switches on the second switch 24 controlled by the sample signal MUX_T_HS when enabling the sample signal MUX_T_HS, and the control signal MUX_RESET is not enabled at the moment, such that the first switch 23 is also switched on which is controlled by the control signal MUX_RESET. Therefore, the readout signal in the readout line 15 during the sample period t1 directly passes through the switched-on first switch 23 to be transmitted to the switched-on second switch 24, and then be transmitted to the second capacitor 25 through the switched-on second switch 24 and stored in the second capacitor 25, for being regarded as the sample reference signal $V_{HS}$. The touch detecting method of the second exemplary embodiment also obtains the sample reference signal $V_{HS}$ during the period t1 between driving the second nearest gate line $G_{n+1}$ and the nearest gate line $G_{n+2}$ preceding the corresponding gate line $G_{n+3}$ of each sense unit 14, thus the capacitance-coupling noise in the sample reference signal $V_{HS}$ has the polarity same to that in the sense signal $V_{HR}$. In addition, when the touch detecting method of the second exemplary embodiment obtains the sample reference signal $V_{HS}$, the readout signal does not pass through the integration circuit composed of the operational amplifier 21 and the first capacitor 22, but passes through the switched-on first switch 23 and the switched-on second switch 24. Thus, the sample reference signal $V_{HS}$ is greatly influenced by the reference voltage $V_{ref}$, and it can reduce the influence of the capacitance-coupling phenomenon.

In addition, when the flat display device 10 displays an image, the capacitance-coupling phenomenon caused by the first group of the gate lines G1~G4 to the sense unit 14 electrically connected with the first group is larger than that caused by those of other groups of the gate lines, thus the capacitance-coupling phenomenon of the first group of the gate lines $G_1$~$G_4$ applied to the sense unit 14 cannot be stable after a while. Therefore, it is understood for persons skilled in the arts that, the present invention can employ the touch detecting method as shown in FIG. 6 into the sense unit corresponding to the first group of the gate lines $G_1$~$G_4$, and employ the touch detecting method as shown in FIG. 5 into the sense units corresponding to other groups of the gate lines. That is, for the sense unit 14 corresponding to the first group of the gate lines $G_1$~$G_4$ of the flat display device 10, the control signal MUX_RESET is in the non-enable state and the first switch 23 is switched on when the readout unit 20 regards the readout signal during the sample period t1 as the sample reference signal $V_{HS}$. Thus the readout signal in the readout line 15 passes through the switched-on first switch 23 instead of the integration circuit composed of the operational amplifier 21 and the first capacitor 22, to be transmitted to the second capacitor 25. For the sense units 14 corresponding to the other groups of the gate lines, the control signal MUX_RESET is in the enable state and the first switch 23 is not switched-on when the readout unit 20 regards the readout signal during the sample period t1 as the sample reference signal $V_{HS}$. The readout signal in the readout line 15 passes through the integration circuit composed of the operational amplifier 21 and the first capacitor 22, to be transmitted to the second capacitor 25. The touch detecting method thereof can make the sample reference signal $V_{HS}$ of the sense unit 14 corresponding to the first group of the gate lines $G_1$~$G_4$ greatly influenced by the reference voltage $V_{ref}$, so as to reduce the influence of the capacitance-coupling phenomenon.

In summary, the touch detecting method of the present invention can make the capacitance-coupling noise in the sample reference signal have the polarity same to that in the sense signal, to cancel out the capacitance-coupling noises in the sample reference signal and the sense signal. Accordingly, the touch detecting method of the present invention can eliminate the influence of the capacitance-coupling phenomenon, and thus the sense result thereof is accurate.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch detecting method applied into a flat display device with an in-cell touch panel, the flat display device comprising a plurality of gate lines, a plurality of data lines, a plurality of sense units and a plurality of readout lines, the gate lines being arranged crossing over with the data lines and thereby dividing the flat display device into a plurality of pixel regions, the sense units being disposed into some of the pixel regions, each of the sense units being electrically coupled to a corresponding one of the gate lines and thereby being driven by a gate signal on the corresponding gate line, and each of the sense units being further electrically coupled to a corresponding one of the readout lines so as to electrically couple to a readout unit, and the touch detecting method comprising:

enabling a sample signal during a period between driving the nearest gate line and driving the second nearest gate line preceding the corresponding gate line of one of the sense units, and sampling a readout signal by the readout unit on the corresponding readout line of the sense unit during a sample period corresponding to the sample signal being enabled, wherein the nearest gate line and the second nearest gate line preceding the corresponding gate line of one of the sense units are not connected to any one of the sense units;

using the readout signal sampled by the readout unit during the sample period as a sample reference signal;

enabling a sense readout signal during another period between driving the corresponding gate line and the nearest gate line succeeding the corresponding gate line of the sense unit, and reading out the readout signal by the readout unit on the corresponding readout line during a sense readout period corresponding to the sense readout signal being enabled, wherein the nearest gate line succeeding the corresponding gate line of the sense unit is not connected to any one of the sense units;

using the readout signal read out by the readout unit during the sense readout period as a sense signal; and determining whether the sense unit is touched according to the sample reference signal and the sense signal;

wherein a capacitance-coupling influence caused by inputted gate signals of gate line driving in the sample reference signal has a polarity same to that of another capacitance-coupling influence caused by inputted gate signals of gate line driving in the sense signal when displaying a specific pattern, resulting from the sample signal being enabled during the period between driving the nearest gate line and driving the second nearest gate line preceding the corresponding gate line of one of the sense units, and the sense readout signal being enabled during the another period between driving the corresponding gate line and the nearest gate line succeeding the corresponding gate line of the sense unit.

2. The touch detecting method as claimed in claim 1, wherein the readout unit comprises:
  an operational amplifier, comprising:
    a positive input terminal electrically coupled to a reference voltage;
    a negative input terminal electrically coupled to the corresponding readout line; and
    an output terminal configured for outputting the sample reference signal or the sense signal;
  a first capacitor electrically coupled between the negative input terminal and the output terminal of the operational amplifier;
  a first switch electrically coupled between the negative input terminal and the output terminal of the operational amplifier and in parallel with the first capacitor;
  a second switch electrically coupled to the output terminal of the operational amplifier;
  a second capacitor electrically coupled between the second switch and a grounding potential, to receive and store the sample reference signal when the second switch is switched on;
  a third switch electrically coupled to the output terminal of the operational amplifier;
  a third capacitor electrically coupled between the third switch and the grounding potential, to receive and store the sense signal when the third switch is switched on; and
  a processor electrically coupled to the second capacitor and the third capacitor to determine whether the sense unit is touched according to the sample reference signal and the sense signal.

3. The touch detecting method as claimed in claim 2, wherein every four of the gate lines in the flat display device are divided into a group, and the sense units are respectively electrically coupled to third gate lines of the groups.

4. The touch detecting method as claimed in claim 3, wherein the first switch is switched off when using the readout signal read out by the readout unit during the sense readout period as the sense signal.

5. The touch detecting method as claimed in claim 4, wherein the first switch is switched on when using the readout signal sampled by the readout unit during the sample period as the sample reference signal.

6. The touch detecting method as claimed in claim 4, wherein the first switch is switched off when using the readout signal sampled by the readout unit during the sample period as the sample reference signal.

7. The touch detecting method as claimed in claim 4, wherein
  for the sense units corresponding to a first group of the gate lines, the first switch is switched on when using the readout signal sampled by the readout unit during the sample period as the sample reference signal; and
  for the sense units corresponding to the other groups of the gate lines, the first switch is switched off when using the readout signal sampled by the readout unit during the sample period as the sample reference signal.

8. A flat display device with in-cell touch panel, comprising:
  a plurality of gate lines;
  a plurality of data lines arranged crossing over the gate lines to divide the flat display device into a plurality of pixel regions;
  a plurality of readout lines;
  a plurality of sense units disposed in some of the pixel regions, and each of the sense units being electrically coupled to a corresponding one of the gate lines and thereby being driven by a gate signal on the corresponding gate line and further electrically coupled to a corresponding one of the readout lines; and
  a plurality of readout units electrically coupled to the sense units respectively through the readout lines;
  wherein when performing a touch detecting operation, a sample signal is enabled during a period between driving the nearest gate line and the second nearest gate line preceding the corresponding gate line of one of the sense units, a corresponding one of the readout units samples the corresponding readout line during a sample period corresponding to the sample signal being enabled to obtain a sample reference signal; a sense readout signal is enabled during another period between driving the corresponding gate line and the nearest gate line succeeding the corresponding gate line of the sense unit, the corresponding readout unit samples the corresponding readout line during a sense readout period corresponding to the sense readout signal being enabled to obtain a sense signal, and then the sense unit whether is touched or not is determined according to the sample reference signal and the sense signal;
  wherein the nearest gate line and the second nearest gate line preceding the corresponding gate line of one of the sense units are not connected to any one of the sense units, the nearest gate line succeeding the corresponding gate line of the sense unit is not connected to an one of the sense units;
  wherein a capacitance-coupling influence caused by inputted gate signals of gate line driving in the sample reference signal has a polarity same to that of another capacitance-coupling influence caused by inputted gate signals of gate line drying in the sense signal when displaying a specific pattern, resulting from the sample signal being enabled during the period between driving the nearest gate line and driving the second nearest gate line preceding the corresponding gate line of one of the sense units, and the sense readout signal being enabled during the another period between driving the corresponding gate line and the nearest gate line succeeding the corresponding gate line of the sense unit.

9. The flat display device with in-cell touch panel as claimed in claim 8, wherein each of the readout unit comprises:
  an operational amplifier, comprising:
    a positive input terminal electrically coupled to a reference voltage;

a negative input terminal electrically coupled to the corresponding readout line; and
an output terminal configured for outputting the sample reference signal or the sense signal;
a first capacitor electrically coupled between the negative input terminal and the output terminal of the operational amplifier;
a first switch electrically coupled between the negative input terminal and the output terminal of the operational amplifier and in parallel with the first capacitor;
a second switch electrically coupled to the output terminal of the operational amplifier;
a second capacitor electrically coupled between the second switch and a grounding potential to receive and store the sample reference signal when the second switch is switched on;
a third switch electrically coupled to the output terminal of the operational amplifier;
a third capacitor electrically coupled between the third switch and the grounding potential to receive and store the sense signal when the third switch is switched on; and
a processor electrically coupled to the second capacitor and the third capacitor to judge whether the sense unit is touched according to the sample reference signal and the sense signal.

10. The flat display device with in-cell touch panel as claimed in claim 9, wherein every four of the gate lines in the flat display device are divided into a group, and the sense units are electrically coupled to third gate lines of the groups.

11. The flat display device with in-cell touch panel as claimed in claim 10, wherein the first switch is switched off when obtaining the sense signal.

12. The flat display device with in-cell touch panel as claimed in claim 11, wherein the first switch is switched on when obtaining the sample reference signal.

13. The flat display device with in-cell touch panel as claimed in claim 11, wherein the first switch is switched off when obtaining the sample reference signal.

14. The flat display device with in-cell touch panel as claimed in claim 11, wherein
for the sense units corresponding to a first group of the gate lines, the first switch is switched on when obtaining the sample reference signal; and
for the sense units corresponding to the other groups of the gate lines, the first switch is switched off when obtaining the sample reference signal.

15. A touch detecting method applied into a flat display device with an in-cell touch panel, the flat display device comprising a plurality of gate lines, a plurality of data lines, a plurality of sense units and a plurality of readout lines, the gate lines being arranged crossing over with the data lines, the sense units being electrically connected to some of the gate lines while electrically unconnected to the others of the gate lines, and each of the sensing units further being electrically connected to a corresponding one of the readout lines, and the touch detecting method comprising:
obtaining a sample reference signal by sampling a readout signal from the corresponding readout line of one of the sense units in a period between sequentially driving two neighboring gate lines preceding a corresponding one of the gate lines which the sense unit electrically connected thereto, wherein the two neighboring gate lines are electrically unconnected to any one of the sense units;
obtaining a sense signal by sampling the readout signal from the corresponding readout line of the sense unit in another period between sequentially driving the corresponding gate line and the nearest gate line succeeding the corresponding gate line, wherein the nearest gate line is electrically unconnected to any one of the sense units; and
determining whether the sense unit is touched according to the sample reference signal and the sense signal;
wherein a capacitance-coupling influence caused by inputted gate signals of gate line driving in the sample reference signal has a polarity same to that of another capacitance-coupling influence caused by inputted gate signals of gate line driving in the sense signal when displaying a specific pattern, resulting from the sample reference signal being obtained by sampling a readout signal from the corresponding readout line of one of the sense units in a period between sequentially driving two neighboring gate lines preceding a corresponding one of the gate lines which the sense unit electrically connected thereto, and the sense signal being obtained by sampling the readout signal from the corresponding readout line of the sense unit in another period between sequentially driving the corresponding gate line and the nearest gate line succeeding the corresponding gate line.

* * * * *